US008364165B2

(12) United States Patent
Seacat et al.

(10) Patent No.: US 8,364,165 B2
(45) Date of Patent: Jan. 29, 2013

(54) METHOD AND SYSTEM FOR PROVIDING ROUTE ALTERNATIVES WHILE USING A CELL PHONE

(75) Inventors: Lisa Anne Seacat, San Francisco, CA (US); Kulvir S. Bhogal, Fort Worth, TX (US); Robert Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 11/781,167

(22) Filed: Jul. 20, 2007

(65) Prior Publication Data

US 2009/0023456 A1    Jan. 22, 2009

(51) Int. Cl.
    *H04W 24/00* (2009.01)
(52) U.S. Cl. ....... 455/456.1; 455/9; 455/67.11; 379/133
(58) Field of Classification Search ............... 455/456.1, 455/11.1, 9, 67.11; 701/117, 119
    See application file for complete search history.

(56) References Cited

U.S. PATENT DOCUMENTS

| 5,095,500 | A  | * | 3/1992 | Tayloe et al. .............. 379/32.01 |
| 7,079,945 | B1 | * | 7/2006 | Kaplan ......................... 701/208 |
| 2002/0029108 | A1 | * | 3/2002 | Liu et al. ....................... 701/208 |
| 2003/0013441 | A1 |   | 1/2003 | Bhogal et al. |
| 2005/0113091 | A1 | * | 5/2005 | Rodriguez et al. ............ 455/436 |
| 2005/0131643 | A1 | * | 6/2005 | Shaffer et al. ................. 701/210 |
| 2005/0137781 | A1 | * | 6/2005 | Hudson ......................... 701/117 |

OTHER PUBLICATIONS

Chestnutt, Alan, Cell Phone GPS Tracking, Ezine Articles, Mar. 9, 2006, 2 pages.

* cited by examiner

*Primary Examiner* — Kwasi Karikari
*Assistant Examiner* — Alexander Yi
(74) *Attorney, Agent, or Firm* — Sawyer Law Group, P.C.

(57) ABSTRACT

A method and system in accordance with the present invention integrates information from cell phone coverage maps with a user's GPS system, thereby making possible the suggestion of alternative routes based on coverage strength and chances of dropping calls in different geographical areas. The method and system in accordance with the present invention can also generate warnings if a user is approaching an area of low or nonexistent coverage, so that the user can take action, such as utilizing a different route or telling the party on the line that the connection may be dropped or disconnected.

13 Claims, 2 Drawing Sheets

METHOD AND SYSTEM FOR PROVIDING ROUTE ALTERNATIVES WHILE USING A CELL PHONE

FIELD OF THE INVENTION

The present invention relates generally to cell phones and more specifically to a system and method for providing alternate route information for a user of a cell phone.

BACKGROUND OF THE INVENTION

Cell phones are utilized in vehicles in a variety of ways. A driver who experiences a dropped cell phone call finds it frustrating. Besides being inconvenient, having a cell phone call dropped may disrupt an important personal or business communication. In the case of a truck driver delivering a security-sensitive load, for example, unexpectedly losing a cell phone connection could lead to increased security risks. In another example, a dropped call might cause a truck driver to miss changes in delivery instructions, thereby losing valuable time and incurring additional fuel costs.

Conventional systems do not anticipate dropped calls, especially in areas where cell phone coverage can be sparse. What is needed is a method and system for anticipating when cell phone coverage may be lost, and for being offered the choice of alternative routes in order to maintain the highest possible level of cell phone coverage. The present invention meets such a need.

SUMMARY OF THE INVENTION

A method and system in accordance with the present invention integrates information from cell phone coverage maps with a user's GPS system, thereby making possible the suggestion of alternative routes based on coverage strength and chances of dropping calls in different geographical areas.

The method and system in accordance with the present invention can also generate warnings if a user is approaching an area of low or nonexistent coverage, so that the user can take action, such as utilizing a different route or telling the party on the line that the connection may be dropped or disconnected.

DETAILED DESCRIPTION

The present invention relates generally to cell phones and more specifically to a system and method for providing alternate route information for a user of a cell phone. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Most cell phone providers offer coverage maps which detail coverage strength by geographic area. The method and system in accordance with the present invention integrates information from cell phone coverage maps with a user's GPS system, thereby making possible the suggestion of alternative routes based on coverage strength and chances of dropping calls in different geographical areas.

The method and system in accordance with the present invention can also generate warnings if a user is approaching an area of low or nonexistent coverage, so that the user can take action, such as utilizing a different route or telling the party on the line that the connection may be dropped or disconnected.

Figure 1:
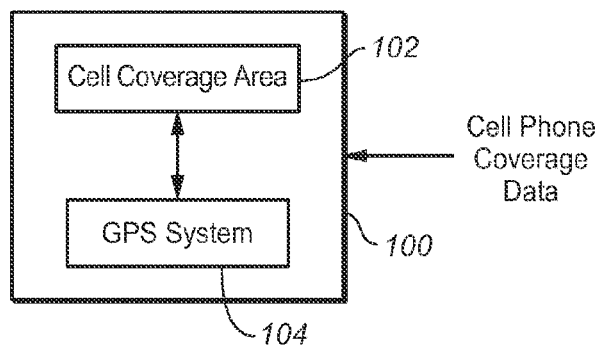
FIG. 1 is a block diagram showing a first embodiment of a system in accordance with the present invention.

FIG. 1 is a block diagram showing a first embodiment of a vehicle 100 in accordance with the present invention. The vehicle could be any of a car, truck, SUV, van, tank, boat or the like that might use a cell phone technology. The vehicle 100 includes a cell coverage area mechanism 102 and GPS system 104 in accordance with the present invention which receives and incorporates cell phone coverage data with the GPS data. The one or more sources of cell phone coverage information could include, for example, data stored within a cell phone or data received from an exterior source such as a receiver. The cell phone coverage data could be retrieved via WiFi, or other wireless systems.

The vehicle 100 could be located within a vehicle such as a car or truck, or could be handheld. The vehicle 100 receives location information and coverage information.

Figure 2:
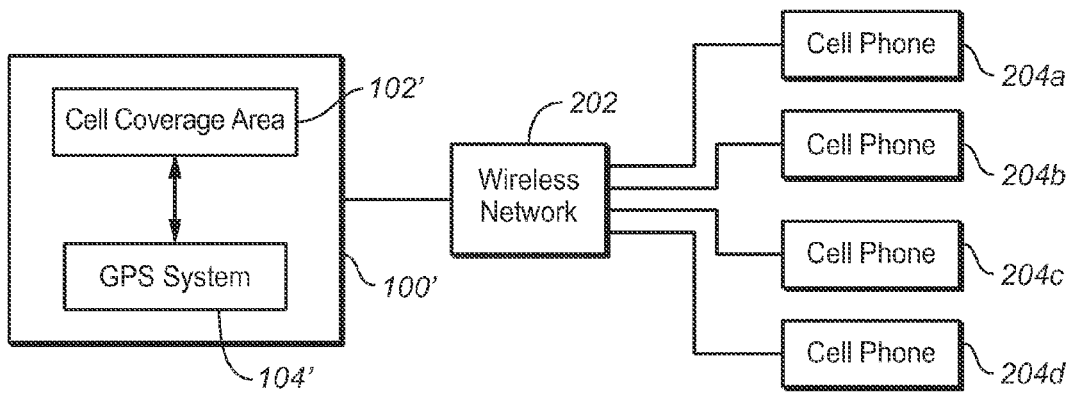
FIG. 2 shows a second embodiment in accordance with the present invention.

FIG. 2 shows a second embodiment in accordance with the present invention. In this embodiment, the vehicle 100 connects with a wireless network 202 and receives instant data from other cell phones 204a-n via the wireless network. Cell phones 204a-n are located at destinations further along the user's chosen route, thereby providing constantly updated cell phone coverage data.

Figure 3:
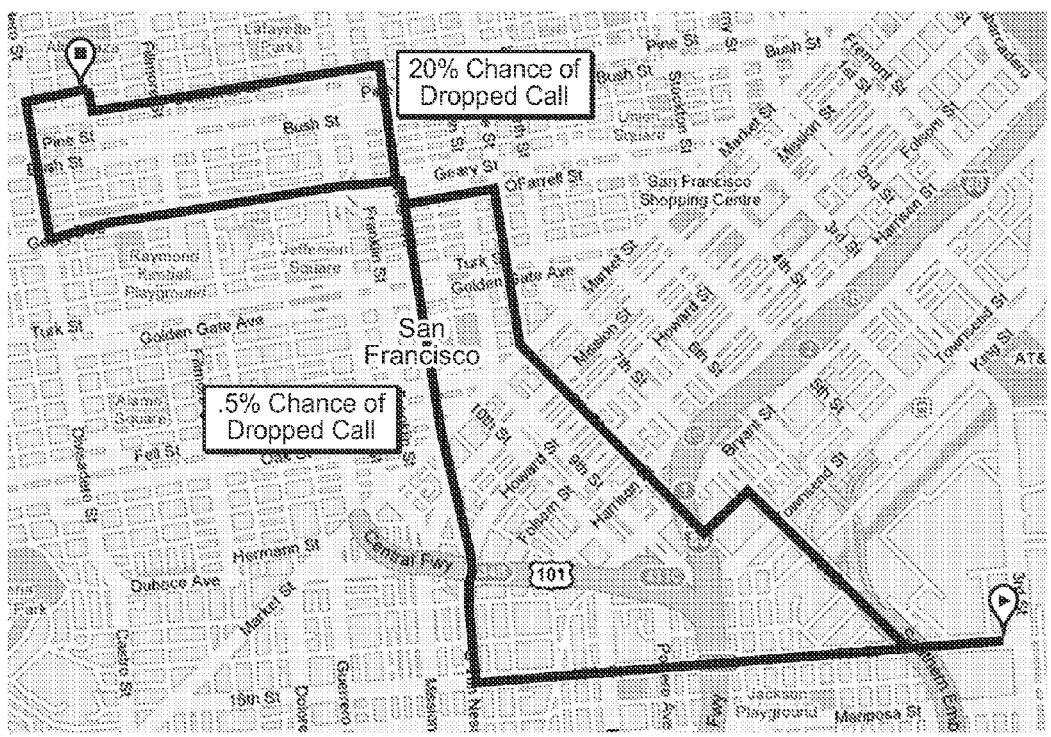
FIG. 3 shows a diagram of a map generated by a GPS device when utilizing a system and method in accordance with the present invention.

FIG. 3 shows a diagram of a map generated by a vehicle 100' when utilizing a system and method in accordance with the present invention. The information displayed shows the user a geographic area 302 where there is a 0.5% chance of a dropped call, and another geographic area 304 where there is a 20% chance of a dropped call. Accordingly, a user can redirect his/her route based on the coverage information.

Figure 4:
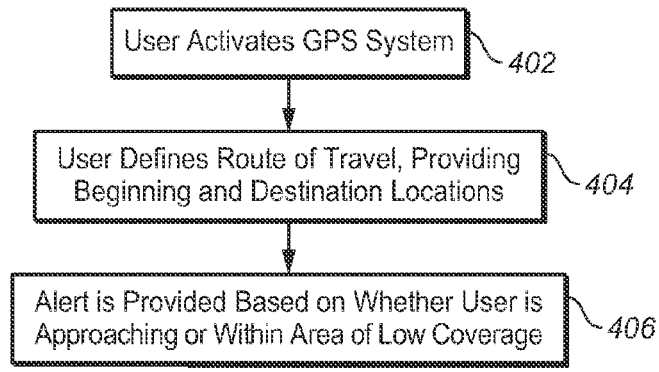
FIG. 4 is a flow chart showing the process in accordance with the present invention.

FIG. 4 is a flow chart showing the process in accordance with the present invention. First, the user activates a GPS system, which includes cell phone coverage area data, via step 402. The cell phone coverage area could be streaming into the GPS device on a continuous basis or it could be downloaded periodically.

Then the user defines the route of travel, providing beginning and destination locations based upon the cell phone coverage, via step 404. Thereafter, an alert is provided based on whether the user is approaching or within an area of low coverage, via step 406. The user can also define (1) the percentage of dropped calls required to trigger an alert, (2) the method of alert, which may include sounds in addition to screen display, and (3) the size and scale of geographic coverage to be included, which will determine how far in advance alerts will be issued.

When an alert is displayed on the GPS system indicating that the user is approaching a poor quality or nonexistent level of coverage, the user may request the GPS system to recalculate the route, in order to redirect the user to an area where coverage is better, or the user may be shown alternative routes which will allow the user to maintain the highest possible quality of cell phone coverage. In addition, the system would allow for a user to specify roaming to receive coverage and incur the costs of such roaming.

Advantages

Utilizing a method and system in accordance with the present invention, users can plan trips so that they are not put in a precarious situation of traveling in an isolated area (e.g., such as a desert) without a cellular connection. Furthermore, they can take evasive actions/alternate routes as proposed by a GPS system so that they do not drop an important call.

For a trucker who is utilizing a truck in conjunction with a business, the software/hardware in accordance with the present invention could be especially advantageous. If a trucker is carrying high-risk security materials, they would want to be able to know if and when cell phone coverage is low or nonexistent, so that they might make route changes in order to be in constant communication regarding their high-risk load. Similarly, a trucker might need the capability of being informed if delivery destinations are changed, delayed or otherwise modified, possibly saving hours of driving and eliminating unanticipated fuel costs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing route alternatives when utilizing a cell phone comprising:

combining a geographical positioning system (GPS) with cell route coverage area information;

defining an initial route from a beginning location to a destination location;

defining a percentage chance of dropped calls that determines whether cell phone coverage is less than acceptable;

utilizing the combined GPS and cell route coverage area information to determine the cell phone coverage on the initial route, wherein the cell phone connects with a wireless network and receives instant data directly only from other cell phones that are located further along the initial route to provide updated cell route coverage area information;

determining if the cell phone coverage is less than acceptable on the initial route; and in response to less than acceptable cell phone coverage, displaying a map showing a percentage of chance of dropped calls for the initial route and another percentage chance of dropped calls for an alternative route in order to change the initial route to the alternative route based upon cell phone coverage information, wherein roaming is specified to receive coverage for the alternative route and to incur costs of such roaming.

2. The method of claim 1 wherein the cell phone coverage information is continuously streamed into the GPS.

3. The method of claim 1 wherein the cell phone coverage information is periodically provided to the GPS.

4. The method of claim 1 wherein the initial route is changed by the GPS recalculating an appropriate route.

5. The method of claim 1 wherein alerts are displayed when the vehicle is provided based on whether a vehicle is approaching any of an area of low coverage and less than acceptable cell phone coverage.

6. The method of claim 5 wherein the alerts may include sounds.

7. A system comprising:

a global positioning system (GPS); and a cell phone coverage information combined with the information from the GPS, combining a geographical positioning system (GPS) with cell route coverage area information;

defining an initial route from a beginning location to a destination location; defining a percentage chance of dropped calls that determines whether cell phone coverage is less than acceptable;

utilizing the combined GPS and cell route coverage area information to determine the cell phone coverage on the initial route, wherein the cell phone connects with a wireless network and receives instant data directly only from other cell phones that are located further along the initial route to provide updated cell route coverage area information;

determining if the cell phone coverage is less than acceptable on the initial route;

and in response to less than acceptable cell phone coverage, displaying a map showing a percentage of chance of dropped calls for the initial route and another percentage chance of dropped calls for an alternative route in order to change the initial route to the alternative route based upon cell phone coverage information, wherein roaming is specified to receive coverage for the alternative route and to incur costs of such roaming.

8. The system of claim 7 wherein the cell phone coverage information is continuously streamed into the system.

9. The system of claim 7 wherein the cell phone coverage information is periodically provided to the system.

10. The system of claim 7 wherein the initial route is changed by the GPS recalculating an appropriate route.

11. The system of claim 7 wherein alerts are displayed when the system is provided based on whether a vehicle is approaching any of an area of low coverage and less than acceptable cell phone coverage.

12. The system of claim 11 wherein the alerts may include sounds.

13. The system of claim 10 wherein the system would allow for a user to specify roaming to receive coverage and incur the costs of such roaming.

* * * * *